(12) United States Patent
Rameshni et al.

(10) Patent No.: US 9,624,106 B2
(45) Date of Patent: Apr. 18, 2017

(54) SUPERSULF-A PROCESS WITH INTERNAL COOLING AND HEATING REACTORS IN SUBDEWPOINT SULFUR RECOVERY AND TAIL GAS TREATING SYSTEMS

(71) Applicants: Mahin Rameshni, Monrovia, CA (US); Stephen L. Santo, La Crescenta, CA (US)

(72) Inventors: Mahin Rameshni, Monrovia, CA (US); Stephen L. Santo, La Crescenta, CA (US)

( * ) Notice: Subject to any disclaimer, the term of this patent is extended or adjusted under 35 U.S.C. 154(b) by 24 days.

(21) Appl. No.: 14/826,198

(22) Filed: Aug. 14, 2015

(65) Prior Publication Data
US 2017/0044015 A1    Feb. 16, 2017

(51) Int. Cl.
C01B 17/04    (2006.01)

(52) U.S. Cl.
CPC .............................. *C01B 17/0456* (2013.01)

(58) Field of Classification Search
None
See application file for complete search history.

*Primary Examiner* — Melvin C Mayes
*Assistant Examiner* — Sheng H Davis (57) ABSTRACT

SuperSulf process refers to an innovative reactor design consisting of internal cooling and heating thermoplate exchangers where it is filled by the Claus type catalysts between plates in the SRU and hydrogenation catalysts in the tail gas unit. SuperSulf reactor consists of 3 reactor zones in the sulfur recovery which operates as a SubDewPoint process where the mode of operation are controlled by switching valves on the utilities streams high pressure steam and high quality water and steam where the first 2 zones operate as hot and cold and switches to cold and hot where the produced sulfur is condensed. The third zone operates as cold all the time where consists of the last sulfur condenser by producing Low pressure steam. The tail gas unit consists of 2 reactor zones of hydrogenation reactor and hydrolysis reactor with internal plate cooling then followed by the tail gas amine with a selective solvent. The thermal incineration system can meet less than 50 ppmv of $SO_2$ and with caustic incineration less than 10 ppmv of $SO_2$ resulting zero emission.

19 Claims, 6 Drawing Sheets

SUPERSULF-A PROCESS WITH INTERNAL COOLING AND HEATING REACTORS IN SUBDEWPOINT SULFUR RECOVERY AND TAIL GAS TREATING SYSTEMS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

This disclosure relates generally to Processes for the conversion of the sulfur compounds to elemental sulfur through reactors equipped with internal cooling and heating thermoplate exchangers as SuperSulf reactors. The SuperSulf reactor is located after the reaction furnace of the Claus unit with air or oxygen operation. After the thermal section of the Claus; the first catalytic stage shall be the conventional Claus reactor consists of alumina and titanium catalysts. The second stage is a 3 zone SubDewPoint reactor equipped with internal heating and cooling thermoplate exchangers. The switching valves are located on the water and steam utility lines. In the tail gas unit after the hydrogenation reactor stage an additional internal cooling reactor is added as the hydrolysis reactor to achieve less than 10 ppmv of SO2 in the stack. The remaining of the tail gas can be conventional amine tail gas or caustic scrubber depending on the size of the sulfur plant. The innovative reactor consists of internal cooling and heating thermoplate exchangers inside of the reactor filled with the Claus catalysts between plates as defined as the SuperSulf Reactor.

DESCRIPTION OF THE RELATED ART

The most commonly used process for recovering elemental sulfur from sulfur compounds is the modified Claus process. The modified Claus process can achieve the sulfur recovery of ranging 93-97% depends of the acid gas feed compositions. The tail gas stream from the Claus unit has to be further processed in one of the common tail as unit technology; tail gas hydrogenation process followed by the amine tail gas to recover the remaining sulfur compounds by achieving about 99.9% recovery. The treated gas from the tail gas absorber flows to the incineration system where the stack has to meet the required emission of SO2 less than 250 ppmv and even in some locations less than 50 ppmv of SO2. In United States and many other countries if the tail gas unit is down the Claus unit has to be shut down due to low sulfur recovery and violation of the emission and they are required to have a backup tail gas unit for such cases.

Sulfur plant operation is a very complicated and challenging job. Acid gas feed to a sulfur plant usually includes wide variation in the volume and concentration of sulfur and other compounds, including a substantial amount of ammonia or amine acid gases in some plants. Theoretically, control of the thermal stage(s) using air, enriched air or oxygen for conversion of H2S to SO2 has permitted some processes to obtain extremely high recovery of sulfur whether for the 2:1 ratio for H2S to SO2 or for H2S-shifted operation. In actual operation, the several interactions of stream component analysis and measurement of flow, temperature, pressure and other process parameters with the compressors, valves, burners, aging or fouled catalyst beds and other process equipment has made error-free, continuous recovery of sulfur from acid gas an elusive goal.

SuperSulf reactors refer to a special innovative reactor design configuration where the reactor consists of internal cooling and internal heating thermoplate exchangers as three zones.

After the thermal section and the Claus catalytic stage; the second reactor in the innovative process is the SuperSulf reactor which, consist of three zones with different mode of SubDewPoint operations. In the adsorption mode the zones shall be (1) hot, (2) cold, and (3) cold, in the regeneration mode the three zones shall be (1) cold, (2) hot, and (3) is cold. Zone three is always cold as operates as the last condenser. Zone 1 and zone 2 switches between hot and cold by switching valves are located on the utility water and steam lines to the internal cooling and internal heating inside of the reactor. These three zones also contain Claus catalyst; alumina, Titanium or any combination of suitable Claus catalysts.

In accordance with the current innovation, the operating pressure for the cold mode 2nd zone of SuperSulf cooling phase and steady operation is 1 barg and for the hot mode 1st zone of the SuperSulf reactor is 36-40 barg. Hot mode steady operation case operates at 40 barg, cold mode steady operation and cold mode cooling phase cases operate at 1 barg. Cooling phase of hot mode reactor starts 2 hours prior to switch over. Pressure decrease ramp from 40 barg to 4 barg is applied. Cooling phase continues in the cold mode during first hour switch over, where steam pressure decreases from 4 barg to 1 barg. The highest steam volumetric flow rate is achieved at 1 barg during this operation mode. Therefore, only the cooling phase at 1 barg is specified for the equipment design.

In this innovative; the sulfur recovery unit can meet minimum of 99.2% without the tail gas unit. The emission of less than 10 ppmv of SO2 can be achieved with special tail gas unit.

The tail gas from the SuperSulf section enters to the tail gas heater and the heated tail gas enters to another SuperSulf reactor consists of 2 zones. The first zone consists of Hydrogenation catalyst as known as CO/MO (cobalt-molybdenum) tail gas catalyst to convert all the sulfur compound to H2S and the second zone consists of internal cooling thermoplate exchanger as defined as hydrolysis reactor to hydrolysis remaining COS and CS2 or any sulfur compound to H2S by using the conventional Claus catalyst which is Alumina or combination of alumina and titanium.

The tail gas reactor consists CO/MO (cobalt-molybdenum) a hydrogenation type catalyst known as tail gas hydrogenation catalyst but no limited to CO, MO, Fe, Zn, Mg, Ni, Mo, Mn, Cr and Al, for conversion of SO2 to H2S, without any limitation using above more selective catalysts are to enhance much higher recovery compare to the conventional tail gas treating unit. In this new innovation the SuperSulf reactors consist of thermoplate exchangers filled with catalysts between plates where these exchangers control the reactor temperature to operate as cycle a SubDewPoint process as cooling and heating thermoplate exchangers.

The present innovation is a SubDewPoint process however the main differences with the past SubDewPoint processes are (1) the switching valves are located on the water and steam utilities lines versus in the commercial units the switching valves are located on the process gas lines containing H2S, SO2, sulfur compounds, and other components which any switching valve leakage would cause operational safety concerns and the mode of operation has to be changed.

Furthermore; in the present innovation (2) the SuperSulf reactor consists of numbers of internal heating and cooling thermoplate exchangers compare to the commercial units where the reactor consists of only one internal cooling only.

In addition, in the present innovation, (3) the tail gas reactor consists of SuperSulf with internal cooling reactor as a hydrolysis reactor to reduce the SO2 emission to less than 10 ppmv.

In accordance with aspects of the present invention, the SuperSulf system will be one reactor unit consisting different sections, while the current SubDewPoint processes require two identical reactors.

The tail gas feed is processed in much smaller tail gas treating unit due to much higher recovery. In addition, the present innovation meets the zero emission near 100% sulfur conversion.

In commercial sulfur recovery, the condensers and reheaters are external. Due to significant changes in sulfur viscosity the external condenser shall operate above sulfur dew point to prevent sulfur plugging; while according to this innovation, by having internal cooling reactor the condenser are located inside of the reactor where it can operate at below sulfur dew point without plugging resulting higher sulfur recovery.

The capital cost of the building tail gas unit is very close to the cost of building a modified conventional Claus unit considering for using it to recover only the remaining sulfur compounds which, were not recovered in the Claus unit, the fact is that it is not cost effective. In present innovative SuperSulf, the tail gas unit is much smaller due to higher recovery in the SRU section and resulting lower capital cost.

The present invention could be used for the existing Claus units by making the required modifications and for new sulfur recovery units to achieve much higher sulfur recovery up to 100% or basically zero emission.

In similar application, (U.S. Pat. No. 4,482,532, dated Nov. 13, 1984, Standard Oil Company), (U.S. Pat. Nos. 5,015,459, 5,015,460 dated May 14, 1991, 4601330 dated May 20, 1985, by Amoco) and (U.S. Pat. No. 8,815,203 dated Apr. 17, 2013, J. Lamar) describes a process of SubDewPoint process known as Cold Bed Adsorption (CBA) where the cooling and heating takes place using external shell and tube exchangers known as sulfur condensers and reheaters. The external sulfur condensers shall operate above sulfur SubDewPoint therefore, the sulfur recovery is significantly lower than SuperSulf new innovation. In addition about 8-12 (2 ways or 3 ways) switching valves required and they are located on the main process lines containing toxic gases as the process requirement which leakage of these valves are major safety concerns and problems during the operation. Finally, two identical CBA reactors are required to change the mode of operation where equipped with only external heating and cooling.

In similar application, European patents, (EP-983252, dated Jul. 5, 1997), (EP-2594328, dated 21 Nov. 2011), (EP-1621250, dated 29 Jul. 2004), (EP-963247 DE-19754185, dated Jun. 12, 1997, (EP-1002571, dated Jun. 11, 1998) by Dr. Michael Heisel through Linde, DEG Engineering and ITS engineering and (EP-14307188, dated Dec. 24, 2014) by Prosernat; where known as Smartsulf reactors. In this process there are 2 identical reactors equipped with only one internal cooling; while the present innovation consists of number of internal heating and cooling in the same shell of SuperSulf reactor. In addition, in Smartsulf processes the 4-way switching valves are located on the process gas lines contains toxic gases which is leakage is a common problem specially leaking acid gas containing H2S, SO2 and other components are safety concerns; while in the current innovation process the switching valves are located on the utilities water and steam lines where any possible leakage are not safety hazard. In addition, since the Smartsulf reactors are located after the thermal section or after direct oxidation, these reactors are fairly large and expensive. While in the new innovation, there is a conventional Claus reactor before SuperSulf reactor and the size of SuperSulf reactor is significantly reduced. Furthermore, in Smartsulf technology two identical reactors are required to switch the mode of operation while in the present innovation SuperSulf there is no requirements for two identical reactors because the changes of mode of operation takes place on the utilities lines through internal heating and cooling thermoplate exchangers in the same unit.

The new innovation SuperSulf reactor is a main key differentiator compare to CBA, MCRC, Smartsulf, Sulfreen or any commercial SubDewPoint process for the sulfur recovery and is a main key differentiator compare to SCOTT, ARCO, SuperClaus, EuroClaus or any commercial tail gas in the tail gas treating section.

This application for patent discloses processes for the SubDewPoint process in the innovation SuperSulf reactors for conversion of sulfur compounds to sulfur after the thermal section or the reaction furnace in the Claus unit and one catalytic Claus stage. The gas from SuperSulf reactor in the SRU flows to the RGU. The tail gas flows to the tail gas unit where another SuperSulf reactor consisting of hydrogenation reactor and the hydrolysis reactor equipped with internal cooling thermoplate exchanger is designed to convent all sulfur species to H2S ultimately to achieve less than 10 ppmv of SO2 in the stack.

BRIEF SUMMARY OF THE INVENTION

The present invention relates to a process for recovering sulfur from sulfur compounds wherein a process gas at least containing H2S, and SO2 derived from a thermal stage or a lean stream catalytic stage first flows through the first catalytic stage of Claus reactor and then the acid gas will be processed in SubDewPoint SuperSulf reactors. The SuperSulf reactors are equipped with internal cooling and internal heating thermoplate type exchangers to produce sulfur and it is filled by the catalysts between plates. The tail gas feed from the sulfur recovery enters the innovative tail gas unit where another SuperSulf reactor consisting of the hydrogenation reactor and hydrolysis reactor equipped with internal cooling which is used to further conversion of sulfur compounds to H2S as reduction and hydrolysis reactors. The present disclosure incorporates a SubDewPoint process where the switching valves are located on the utilities line; water and steam flows to the internal cooling and heating thermoplate exchangers inside of the reactors. The thermoplate exchangers are filled by the Claus type catalysts between plates in the SuperSulf Claus section, and in the tail gas unit the SuperSulf reactor consists of tail gas hydrogenation catalyst, alumina catalyst but no limited to mixture of CO, MO, Fe, Zn, Mg, Ni, Mo, Mn, Cr and Al, for conversion of $SO_2$ to $H_2S$, without any limitation using mentioned catalyst to increase selectivity that are to enhance of much higher recovery compare to the conventional tail gas treating unit.

In accordance with aspects of the present invention, the process comprises a thermal stage for an $H_2S$-rich acid gas feed or catalytic stage (such as a direct oxidation Selectox catalyst stage) for an $H_2S$-lean acid gas feed where $H_2S$ is oxidized at least in part to $SO_2$ or where a process gas is obtained with a reactionable amount of $SO_2$ in the presence of a significant amount of $H_2S$.

The acid gases are processed in the thermal section are the amine acid gas and the sour water stripper gases containing but not limited to $H_2S$, $NH_3$, HCN, $H_2$, CO, $CO_2$, $O_2$ COS, $N_2$, $CS_2$, hydrocarbons, mercaptans, sulfur vapors and steam water.

The thermal section consists of the reaction furnace and acid gas burner operates with air, enriched air with oxygen up to 100% oxygen as combustion agent. For low $H_2S$ concentration natural gas supplement is added to boost the combustion temperature.

In accordance with the present invention, the reaction furnace consists of at least one refractory vessel for air operation and more than one refractory vessel for oxygen enrichment operation to control the combustion temperature. Each vessel consists of minimum one or two zones.

In the thermal stage, reducing gases such as $H_2$ and CO are formed via dissociation reactions under overall substoichiometric combustion; in the thermal stage and the Claus stage(s), elemental sulfur is produced according to the Claus reaction.

In accordance with first aspects of the present invention, the process comprises one or more catalytic stages in which consists of alumina and Titanium catalysts which to perform Claus reaction and to hydrolyze COS, $CS_2$ and other sulfur compounds by products from the thermal stage to $H_2S$ according to the Claus reaction of $(2H_2S+SO_2 \rightarrow 2H_2O+3/n\ S_n)$ produces elemental sulfur.

In accordance with second aspects of the present invention, the process comprises several subsequent catalytic stages in the SuperSulf innovative reactors configuration equipped with internal heating and cooling thermoplate type exchangers which are filled by the catalysts between plates.

In accordance with third aspects of the present invention, the SuperSulf reactor consists of three zones with different mode of SubDewPoint operation. In the adsorption mode the zones shall be (1) hot, (2) cold, and (3) is cold, in the regeneration mode the three zones shall be (1) cold, (2) hot, and (3) cold. Zone three is always cold as the last condenser. Zone 1 and zone 2 switches between hot and cold by switching valves are located on the utility water and steam lines to the internal cooling and internal heating inside of the reactor. These three zones contain Claus catalysts; alumina, Titanium or any combination of suitable Claus catalysts.

In accordance with fourth aspects of the present invention the operating pressure for the cold mode 2nd zone of SuperSulf cooling phase and steady operation is 1 barg (14.5 psig) and for the hot mode 1st zone of the SuperSulf reactor is 36-60 barg (522-870) psig preferably 40 barg (580 psig). Hot mode steady operation case operates at 40 barg, cold mode steady operation and cold mode cooling phase cases operate at 1 barg. Cooling phase of hot mode reactor starts 2 hours prior to switch over. Pressure decrease ramp from 40 barg (580 psig) to 4 barg (58 psig) is applied. Cooling phase continues in the cold mode during first hour switch over, where steam pressure decreases from 4 barg to 1 barg (58 to 14.5 psig). The highest steam volumetric flow rate is achieved at 1 barg during this operation mode. Therefore, only the cooling phase at 1 barg (14.5 psig) is specified for the equipment design.

In accordance with fifth aspects of the present invention where the SuperSulf reactors operate as SubDewPoint process where the switching valves are located on the utility lines water and steam where valve leakage would not be a safety concerns. The switching valves are 2-way, 3-way or 4-way valves.

In accordance with sixth aspects of the present invention, the tail gas from SuperSulf reactors containing $H_2S$, $SO_2$, $H_2$ and CO is preheated then enters into the innovation reactors consisting another SuperSulf reactors; first hydrogenation section; and the second is hydrolysis reactor consists of internal cooling thermoplate exchangers filled by the hydrolysis catalyst between plates to convert the remaining of sulfur species to $H_2S$. The catalysts are hydrogenation CO/MO (cobalt-molybdenum) catalyst, alumina, but no limited to CO, MO, Fe, Zn, Mg, Ni, Mo, Mn, Cr and Al, for conversion of $SO_2$ to $H_2S$, without any limitation using mentioned catalysts to increase the selectivity that are to enhance to a much higher recovery compare to the conventional tail gas treating unit.

In accordance with seventh aspects The hydrogenation section of the tail gas unit including SuperSulf reactor is followed by the tail gas amine unit where by using a selective amine solvent the absorber overhead meets the $H_2S$ specification of less than 10 ppmv and overall recovery of 99.99% or less than 10 ppmv of $SO_2$ in the stack is achievable with lower capital and operating costs. By combining the conventional Claus thermal and catalytic stages, the SuperSulf reactors in the SRU and TGU an overall sulfur recovery efficiency of over 99.99% can be obtained.

In accordance with eighth aspects of the present invention, the process comprises, wherein, the tail gas from the Claus unit is processed in the tail gas processing units consisting of SuperSulf hydrolysis reactor and incineration with or without caustic scrubber.

In accordance with ninth aspects of the present invention, the tail gas feed stream is further processed in amine section of the tail unit using amine selective solvent to achieve near 100% sulfur recovery efficiency.

In one preferred embodiment, $H_2S$ (hydrogen sulfide) in the acid gas feed is partially oxidized with oxygen in a thermal stage before further conversion in one or more Claus catalytic stages. The $H_2S$:$SO_2$ ratio in the gases reacted in the Claus stage is preferably at 2:1, although the process of the present invention may be practiced with a ratio of higher or lower than 2:1 without significantly affecting the overall sulfur recovery efficiency of the process.

In accordance with tenth aspects of the present invention due to lean acid gas and low $H_2S$ concentration, it is not suitable to apply a thermal stage due to the difficulty in sustaining stable flames therein. In conjunction with a catalytic first stage using a direct oxidation catalyst such as Selectox or titanium; the present invention is also applicable to more completely recover elemental sulfur from lean streams, for both the non-recycle and recycle processes using Selectox or similar catalysts. The recycle process uses a cooled first stage effluent recycled to the inlet of the first stage to control temperature rise across the stage upstream of SuperSulf reactor For acid gas streams with less than about 5 mole percent H2S, no recycle is generally needed.

The new invention offers the following advantages:

(1) The innovative SuperSulf reactors consists of internal heating and internal cooling thermoplate exchanger type while operate as a SubDewPoint reactors the switching valves are located on the utilities lines for changing the mode of operation of the SubDewPoint process and for controlling the reactor temperatures and as the results two sets of identical reactors are not required. The SuperSulf reactor consists of three zones with different mode of SubDewPoint operation. In the adsorption mode the zones shall be (1) hot, (2) cold, and (3) is cold, in the regeneration mode the three zones shall be (1) cold, (2) hot, and (3) is cold. Zone three is always cold acts as the last condenser. Zone 1 and zone 2 switches between hot and cold by switching valves are located on the utility water and steam lines to the internal cooling and internal heating inside of the reactor. These three zones contain Claus catalyst; alumina, Titanium or any combination of suitable Claus catalyst. This is the key difference of this invention versus all other current technologies like CBA, MCRC, Sulfreen, and Smartsulf that requires 2 identical reactors and equipped with only internal cooling elements. In addition switching valves operates with the acid gas while in new innovations switching valve operates the utilities like steam and water.

(2) In the present innovation; the front-end section comprises a thermal stage feeding its effluent to the Claus catalytic stages, the effluent preferably having an H2S:SO2 ratio of 2:1 for optimal sulfur recovery efficiency in accordance with the Claus reaction. Then it follows by at least one Claus reactor upstream of SuperSulf reactors containing Alumina and Titanium catalysts. As the results the SuperSulf reactors are significantly smaller resulting lower operating and capital costs.

(3) The switching valves are located on the utilities lines where any valve leakage would not cause safety concerns while in the CBA, MRC, Sulfreen, Smartsulf and any other SubDewPoint processes the switching valves are used in main process gas containing H2S, SO2 and toxic gases where any leakage would cause safety concerns and the defected valves have to be switched off. In present innovation the switching valves could be 2-way, 3-way or 4 way valves.

(4) In accordance with the present innovation, The SuperSulf reactors are also used in the tail gas section where SuperSulf consists of hydrogenation reactor and hydrolysis reactor with internal cooling thermoplate exchangers to convert any sulfur species such as SO2, COS, CS2 to H2S. while any other technologies as a tail process, such as Smartsulf, SCOTT, ARCO, CBA, MCRC, Sulfreen, SuperClaus, EuroClaus or any other tail gas units do not have SuperSulf reactors consisting of hydrogenation and hydrolysis catalysts with internal cooling for conversion of Sulfur specious to H2S. The catalysts are hydrogenation CO/MO catalyst, alumina, but no limited to TI, CO, MO, Fe, Zn, Mg, Ni, Mo, Mn, Cr and Al, for conversion of Sulfur specious to H2S.

(5) The SuperSulf tail gas reactors outlet gas then goes to water removal step in the quench system and to the tail gas amine section where the absorber overhead contains less than 10 ppm of H2S and the acid gas from the regeneration overhead is recycled back to the front thermal section where near 100% recovery could be achieved that is a new milestone for the zero emissions of environmental regulations.

(5) Within the control fluctuations and deviations created under actual operating conditions of the modern sulfur plants, typical operation of the thermal stage in such sulfur plants with the modified Claus process produces more than the necessary stoichiometric amount of reducing gases for the subsequent hydrogenation reactor in the tail gas unit therefore, external hydrogen as the reducing gas would rarely be needed.

(6) A modified 3-stage Claus plan has a typical overall recovery of 93-98% of sulfur from the acid gas feeds, while in the innovative process of SuperSulf sulfur recovery of minimum 99.5% can be achieved. If higher recovery is required then the tail gas can be added to achieve less than 10 ppmv of SO2. Since the SuperSulf SRU has higher recovery compare to the modified Claus, therefore, the size of the tail gas unit will be smaller compare to conventional tail gas and lower operating and the capital cost.

(7) In accordance with this innovation; the SuperSulf reactors achieve much higher sulfur recovery compare to any commercial technology in the market, for smaller capacity sulfur recovery, the tail gas can be limited to the incineration and the caustic scrubber to achieve less than 10 ppmv of SO2 and the hydrogenation section and the amine section in the tail gas in some cases such as small capacity can be eliminated.

Many plants must recover sulfur from lean sulfur streams (from trace amounts to 30 mole percent) for which it is not suitable to apply a thermal stage due to the difficulty in sustaining stable flames therein. In conjunction with a catalytic first stage using a direct oxidation catalyst such as Selectox or Titanium, the present invention is also applicable to more completely recover elemental sulfur from lean streams, for both the non-recycle and recycle processes using Selectox or similar catalysts. The recycle process uses a cooled first stage effluent recycled to the inlet of the first stage to control temperature rise across the stage upstream of SuperSulf reactor For acid gas streams with less than about 5 mole percent H2S, no recycle is generally needed.

Another embodiment of the present invention comprises using 2 different water and steam pressure in the internal thermoplate exchangers during normal operation and adsorption mode of operation. In that regard, where the high pressure represents the nominal 600 psig and the low pressure represents 30-60 psig, however, the actual range depends on the utilities condition of each facility. Produced condensate can be used as a boiler feed water since it is chloride free and has a better quality.

The innovative SuperSulf reactors are horizontal or vertical depends on the size and normally made from high grade stainless steel.

BRIEF DESCRIPTION OF THE DRAWINGS

The following figures are part of the present disclosure and are included to further illustrate certain aspects of the present invention. Aspects of the invention may be understood by reference to one or more figures in combination with the detailed written description of specific embodiments presented herein.

Each figure consists of 4 pages while some pages are commonly used in more than one figure. In summary, FIG. 1 has 4 pages as described as figures (1-1a, 1-1b, 1-1c, and 1-1d). FIG. 2 has 4 pages as described as figures (1-1a, 1-1b, 1-1c, and 2-2a). FIG. 3 has 4 pages as described as figures (3-3a, 1-1b, 1-1c, and the last figure is described as FIG. 1-1d or as an alternate FIG. 2-2a).

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or the scope of the inventive concepts or the appended claims in any manner. Rather, the figures and detailed written descriptions are provided to illustrate the inventive concepts to a person of ordinary skill in the art and enable such person to make and use the inventive concepts.

DETAILED DESCRIPTION OF THE INVENTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicant has created new processes for the conversion of sulfur compounds to elemental sulfur using SuperSulf SubDewPoint reactors consists of internal cooling and internal heating thermoplate exchangers filled by the catalysts between plates in both the sulfur recovery and tail gas treating units.

The present invention relates to processes for recovering sulfur for onshore and offshore applications; refineries, gas plants, IGCC, gasification, coke oven gas, mining and minerals sour gas field developments and flue gas desulfurization onshore and offshore wherein sulfur recovery unit is required for new units or revamps.

In accordance to aspects of this invention; the SuperSulf reactor operates in a SubDewPoint mode where the cycles are (hot, cold, cold) and (cold, hot, cold) to achieve higher recovery. In addition, further the combination of SubDewPoint operation and internal cooling and heating reactors increase the sulfur recovery to the maximum level since the condenser can operate below sulfur dew point without plugging and in addition the sulfur entrained is minimized resulting much higher sulfur recovery.

In accordance with aspects of the present invention, it is an object of the present disclosure to provide a process for producing elemental sulfur economically acceptable for, present day industrial operations and higher safety standard.

Another object is to provide such a process which can tolerate variances in operating conditions within a given range without major equipment adaptations. A further object is to provide a process which can be utilized in co-acting phases to provide, at acceptable economics, the capacity required in present-day industrial operations, easy to operate and more reliable and robust operation.

In the discussion of the Figures, the same or similar numbers will be used throughout to refer to the same or similar components. Not all valves and the like necessary for the performance of the process have been shown in the interest of conciseness. Additionally, it will be recognized that alternative methods of temperature control, heating and cooling of the process streams are known to those of skill in the art, and may be employed in the processes of the present invention, without deviating from the disclosed inventions.

In the reaction furnace, the hydrocarbon containing gas stream comprises one or more hydrocarbons selected from the group consisting of alkanes, alkenes, alkynes, cycloalkanes, aromatic hydrocarbons, and mixtures thereof.

The figures illustrate steam reheaters that heats up the gas by using steam, however, any suitable heat exchanger, using different heating media, or fired reheaters using natural gas or acid gas, and hot gas bypass maybe employed in this service.

The figure illustrates a waste heat boiler that produces steam, however, any suitable heat exchanger, such as a water heater, steam superheater or feed effluent exchanger may be employed in this service.

The reaction furnace is equipped with one or more checker wall or choke ring to create the turbulent velocity of gas for a better mixing and to prevent cold spot and condensation. In addition the checker wall near the tube sheet of the waste heat boiler to protect the tube sheet from the heat radiation from the burner.

In accordance to this invention; the rate of the air, enriched air or oxygen enrichment stream is adjusted such that the mole ratio of hydrogen sulfide to sulfur dioxide in the gaseous-mixture reaction stream ranges from 2:1 to 10:1.

In accordance to this invention; where the pressure of boiler feed water, steam condensate and steam are up to 100 barg (1450 psig), while the operating pressures are in a range of 40 barg to 60 barg (580 psig to 870 psig).

The first and the second converter comprises at least one Claus catalyst, consisting of alumina, promoted alumina, and titania.

The converters in the Claus conversion step of this present process disclosure, employ one or more Claus catalysts including alumina catalysts, activated alumina catalysts, alumina/titania catalysts, and/or titania catalysts, Iron with Zinc, Iron with Nickel, Cr, Mo, Mn, Co, Mg with promoter on Alumina and with any other combination or any other catalyst systems which are employed in the Claus process, the catalysts having a range of surface area, pore volume, shapes (e.g., star shaped, beads, or powders), and percent catalyst content (in non-limiting example, from about 50 wt. % to about 95 wt. % Al2O3, having a purity up to about 99+%), without any limitations. The Claus processes within converter and subsequent converters, such as converter may be carried out at conventional reaction temperatures, ranging from about 200° C. to about 1300° C., and more preferably from about 240° C. to about 600° C., as well as over temperature ranges between these ranges, including from about 210° C. to about 480° C., and from about 950° C. to about 1250° C., without limitation.

The SuperSulf TGU reactor consists CO/MO (cobalt-molybdenum) a hydrogenation type catalyst known as tail gas hydrogenation catalyst but no limited to CO, MO, Fe, Zn, Mg, Ni, Mo, Mn, Cr, Ti and Al, for conversion of SO2 to H2S, without any limitation using above more selective catalysts are to enhance much higher recovery compare to the conventional tail gas treating unit.

In this new innovation the SuperSulf reactors in the SRU section consist of thermoplate exchangers filled with catalysts between plates where these exchangers control the reactor temperature to operate as cycle a SubDewPoint process as cooling and heating thermoplate exchangers.

The number of Claus conversion steps employed, which may range from one stage to more than ten, depends on the particular application and the amount of sulfur recovery required or desired. In accordance with certain non-limiting aspects of the present disclosure, the number and placement of multiple converters/reactors, and the associated condenser systems, may be adjusted without affecting the overall thermal reduction process described herein.

The process is typically able to achieve an overall sulfur recovery efficiency of greater than about 98%, and preferably greater than 99.5%, based on the theoretical amount of recoverable sulfur.

With continued reference to the invention, the tail gas stream upon exiting the last reaction stage may optionally be conveyed to any typical tail gas absorption process, Cansolv process or any type of incineration process including caustic scrubber to increase sulfur recovery efficiency to about 100%.

Accordance to the present invention the detailed description of the figures are in 4 steps: Step 1—Conventional Claus thermal stage with high intensity burner; step 2—at least one Claus catalyst containing titanium catalyst to hydrolyze COS and CS2 from the reaction furnace and to perform Claus reaction; step 3—a 3 Zone SuperSulf reactor consisting of internal heating and cooling thermoplate exchangers filled by the Claus catalyst between plates where operates as a SubDewPoint process by changing the utility conditions through switching valves and step 4—a two zone SuperSulf reactor in the tail gas unit consists of hydrogenation catalyst and the second zone is hydrolysis catalyst and internal cooling.

The last condenser is located inside of SuperSulf third zone or external exchanger at least one heat exchanger or multiple heat exchangers, dual condensers or combination of water coolers and air coolers to achieve maximum sulfur condensation and sulfur recoveries.

The recovering process from catalytic zones of the catalytic stages comprises cooling the product gas stream in one or more sulfur condensers to condense and recover elemental sulfur from the product gas stream.

In the reaction furnace, the hydrocarbons containing gas stream comprises one or more hydrocarbons selected from the group consisting of alkanes, alkenes, alkynes, cycloalkanes, aromatic hydrocarbons, and mixtures thereof.

The new invention comprises that the SuperSulf reactor operates as a SubDewPoint process and the mode of operation are hot, cold, cold and switches to cold, hot, cold by switching utilities to these reactors at different pressure.

The new invention comprises that the produced sulfur from each zone of SuperSulf reactor flows to the sulfur collection pit in the cold mode.

The new invention comprises that the hot zone of SuperSulf reactor has a fixed outlet temperature slightly above the sulfur dew point where the internal heating thermoplate exchangers provides the heat. The cold zone is operated at lower temperature shifting the chemical equilibrium further towards more sulfur formation using internal cooling thermoplate exchangers. Actually the outlet temperature is chosen in the range 100° C. to 125° C., i.e. maybe even below the sulfur solidification point.

The new invention comprises that the sulfur recovery of up to 99.99% or less than 10 ppmv of SO2 in the stack is achieved.

The new invention comprises that in SubDewPoint processes, the advantage of the internally cooled and heated reactor is evident: Temperatures can be adjusted and kept constant by controlled internal heat sinks. This simplifies the precooling-adsorption-regeneration procedure dramatically. Furthermore, the possibility of fixing and equalizing the temperature by controlled heat sinks makes it possible to choose lowest SubDewPoint temperatures. In state-of-the-art processes an allowance of 10 to 15° C. above the solidification temperature has to be maintained to prevent freezing and subsequent sulfur plugging in colder areas, e.g. close to reactor walls. This allowance can be scrapped completely in the internally cooled reactor. In fact, there is no risk of blocking at temperatures even below the freezing point: The sulfur is adsorbed faster in the catalyst pores than it accumulates on the surface and therefore has no influence on the gas flow. In addition, the embedded heat exchanger keeps the temperature evenly distributed over the cross section of the reactor. This prevents the accumulation of solid sulfur in peripheral areas as is often observed in adiabatic reactors.

The tail gas stream from the last condenser flows to the tail gas unit consists of SuperSulf reactor, quench system and the selective amine type in the amine tail gas unit where the absorber overhead meets less than 10 ppmv of H2S and the incinerator can be kept as hot standby.

In accordance to this invention, the acid gas from the amine regeneration overhead is recycled to the front of sulfur recovery unit.

Turning now to the FIG. 1-1*a*, in the reaction furnace (1) the acid gas streams, streams 20, 21 and the possible pit vent from the sulfur degassing stream (24) are partially oxidized with air, enriched air or oxygen, stream 22 in the reaction furnace combustion chamber zones; (no. 2 and no. 4) according to the basic chemistry of the Claus process. The acid gas stream is split into two streams where stream 21 is combined with the ammonia acid gas and the remaining of the amine acid gas stream 23 flows to the second zone of the reaction furnace (4) to provide enough flexibility to the operators by adjusting the split flow to achieve the required combustion temperature for destruction of ammonia and hydrocarbons. The choke ring or checker wall located inside of the reaction furnace is shown (5). The sulfur is formed as a vapor, and other forms of elemental sulfur are formed in the gas. Combustibles in the gas will burn along with the H2S, and sulfur compounds are formed with their combustion products. Also, H2S will dissociate at high temperature forming hydrogen and elemental sulfur. The acid gas recycle from the tail gas amine unit is added to the total amine acid gas to the reaction furnace.

Sulfur is formed thermally in the reaction furnace and the products from the exothermic reactions stream 25 are cooled in the Waste Heat Boiler (10) by generating high pressure steam and then stream 26 further cooled in the No. 1 condenser (11) which generates low pressure steam.

The reaction furnace consists of a refractory checker wall near to the waste heat boiler to protect the tube sheet of the waste heat boiler from the heat radiation from the burner.

The condensed sulfur is separated from the gas in a coalescer section that is integral within each condenser and fitted with a stainless steel wire mesh pad to minimize sulfur entrainment. The sulfur stream 40 drains from the condenser through a sulfur seal and sample box to the sulfur pit.

The outlet gas from the No. 1 condenser (11) stream 28 is heated indirectly in the No. 1 reheater (12) by high pressure steam and then stream 30 enters the No. 1 converter (13) which the converter contains mostly Titanium catalyst to hydrolyze the COS and CS2 formed from the thermal section of this invention (1) plus contains Claus catalyst types such as alumina and promoted alumina catalyst to perform the Claus reaction; as the results Sulfur is formed by an exothermic reaction, which creates a temperature rise across the catalyst bed. The converter No. 1 effluent stream 31 is then cooled in the No. 2 condenser (14) by generating low pressure steam and the condensed sulfur stream 41 is drained to the sulfur pit.

According to this invention, SuperSulf reactors (15) consists of 3 zones of catalytic stages equipped with internal heating and cooling thermoplate exchangers where filled by the Claus catalysts between plates. The mode of operation are related to internal thermoplate exchangers where operate as heating or cooling. In adsorption mode the stages are hot, cold and cold and in regeneration mode where sulfur is recovered the stages are cold, hot and cold. In the adsorption mode the gas from the condenser No. 2 stream 33 is reheated inside of the first zone by thermoplate exchangers and filled by the Claus catalysts between plates the sulfur is accumulated in the first zone. Changing the heating and cooling of these exchangers are managed by the switching valves (16,17) where sending high pressure steam to the heating exchanger and sending high quality boiler feed water or condensate to cooling thermoplate exchanger in different mode of operation. The third zone of SuperSulf reactor is always cold as performs as the last condenser where low or low low pressure steam is generated in the last internal condenser thermoplate exchangers and can be exported. During the regeneration mode of operation is cold, hot and cold. Depending on the reactor mode of operation and the cycle occurs the produced sulfur is condensed and flow to the sulfur pit by streams 42, and 43 and 44 and the total sulfur flows to the sulfur collection pit with stream 50.

The switching occurs between zone 1 and zone 2 at least every 24 hours or more depending on the sulfur accumulation and the tail gas stream (60) from the zone 3 flows to the SuperSulf tail gas treating unit.

The SubDewPoint operation mode can be kept until the pores of the catalyst in the cold zone are saturated with liquid or solid sulfur. The cycle time is in the range of 24 to 48 hours, depending on plant load. Regeneration is accomplished by simply reversing the sequence of the two zones. What was the 1st zone is free of sulfur and shifts to the adsorber position. The sulfur-saturated 2nd zone then becomes the 1st zone. The sulfur in this zone will be desorbed in the hot operating conditions of the 1st zone.

To minimize sulfur emissions during switch-over the zone in the hot position is precooled: Approximately one hour before the switch-over, the temperature of the coolant is lowered to the cold zone's set point. Consequently, the zone outlet temperature decreases. When this temperature is approximately 160° C. the switch-over is initiated. The switch-over itself is a matter of a few seconds only. A zone sequence control device calculates and initiates each step of the cyclic procedure. The sequence runs fully automatically without requiring any operator action. With the switch-over procedure finished, the zones changed their positions in the process and a new cycle starts.

In SubDewPoint processes, the advantage of the internally cooled reactor is evident: Temperatures can be adjusted and kept constant by external heat sinks. This simplifies the precooling-adsorption-regeneration procedure dramatically. Furthermore, the possibility of fixing and equalizing the temperature by external heat sinks makes it possible to choose lowest SubDewPoint temperatures. In state-of-the-art processes an allowance of 10 to 15° C. above the solidification temperature has to be maintained to prevent freezing and subsequent sulfur plugging in colder areas, e.g. close to reactor walls. This allowance can be scrapped completely in the internally cooled reactor. In fact, there is no risk of blocking at temperatures even below the freezing point: The sulfur is adsorbed faster in the catalyst pores than it accumulates on the surface and therefore has no influence on the gas flow. In addition, the embedded heat exchanger keeps the temperature evenly distributed over the cross section of the reactor. This prevents the accumulation of solid sulfur in peripheral areas as is often observed in adiabatic reactors.

Turning to FIG. 1-1b where the tail gas stream (60) from the last condenser flows to the reheater (18) before entering to another SuperSulf reactor (19). The reheater (18) can be line burner or indirect high pressure steam reheater at lean one reheater to heat up the tail gas stream. The tail gas SuperSulf reactor consists of 2 zones, the first zone consists of hydrogenation catalyst as known as CO/Mo (cobalt-molybdenum)catalyst. The second zone of the tail gas SuperSulf reactor consists of internal cooling thermoplate exchangers filled by the Claus catalysts between plates for hydrolyzing the remaining COS and CS2 from the hydrogenation reactor, the second zone s hydrolysis reactor zone where in order to meet tight SO2 emission from the thermal incinerator stack to less than 30-50 ppm of SO2 the presence of hydrolysis reactor is very essential.

In most cases the reaction furnace in the sulfur recovery produce enough hydrogen as a byproduct that is adequate for the conversion of SO2 to H2S in the hydrogenation reactor however, external hydrogen would be available as necessary to achieve at least 2% excess hydrogen at the outlet of the reactor is measured at the quench column overhead stream. The gas leaving the hydrolysis reactor stream (62) contains H2S, water, nitrogen, hydrogen, CO2, hydrocarbons and other components flows to the quench system.

The gas is further cooled, and water is condensed in the quench column (20). The quench column is a one-stage or 2-stage column in which the gas is first desuperheated by contact with a circulating water stream and then further cooled, and most of the water in the gas is condensed, by contact with a circulating stream of cooled water in a packed bed by stream (66). A pH analyzer with a low-pH alarm is installed in the circulation line and will indicate when the pH of the quench water is reducing, from either a breakthrough of SO2, or incomplete reduction of the sulfur compounds in the gas stream from the hydrogenation reactor. Water is evaporated as the gas is desuperheated. Water is returned to the desuperheater section from the upper quench column section under level control.

In the upper packed section of the column, most of the water vapor in the tail gas is condensed by direct contact with a circulating stream of cooled water pumped by the quench column circulating pump. The water must be removed from the gas to prevent water balance problems in the amine treating section. The circulating water is cooled first in the quench column air cooler (24) and further cooled in the quench column water cooler (22), which uses cooling water as the cooling medium. As the gas cools, water is condensed.

The condensed water is purged from the column to the sour water system on level control. During start up, about 33% of the design quench column overhead stream 63 is recycled to the tail gas heater or quench system by the start-up blower start up eductor (21). This provides the process gas flow required to heat up the hydrogenation reactor and to violate the emissions during the startup. The quench overhead stream (63) flows to the tail gas absorber (26) to separate the H2S from the gas by using amine type selective solvent.

As the hydrogenation catalyst ages in the hydrogenation reactor, there is SO2 break through the quench column since SO2 will contaminate the amine unit, there is small amount of ammonia or caustic injected to the bottom of quench column to capture any possible SO2 break through. The selection of ammonia or caustic depends on the facility availability and the design of the quench system.

In the tail gas absorber (26), Tail gas from the quench column flows into the Amine Absorber, where H2S is preferentially absorbed by the amine solution. The amine solution reduces the H2S content in the absorber overhead stream. A formulated solvent formulated MDEA based solution in water is used to treat the tail gas. Rich amine is pumped by the rich amine pump (27) from the bottom of the amine absorber (26) to the regenerator by stream (68). Rich amine is preheated in the lean/rich amine exchanger (31).

In reference to FIG. 1-1C, the regenerator column (28) consists of a lower stripping section and an upper condensing section. The stripping heat is provided by saturated low pressure steam through a regenerator reboiler (30). In the condensing section, the rising vapor is cooled by contact with cooled quench water. The quench water is pumped by the regenerator pump and cooled in the regenerator overhead air cooler (29). The cooling load is adjusted to control the overhead gas temperature. Overhead gas from the regenerator stream (70) is recycled to the front of the Claus sulfur recovery unit.

Lean amine is cooled then pumped in the lean/rich amine exchanger 31 and then pumped by (35). The amine is further cooled in the lean amine air cooler 33 and the lean amine water cooler (34), which uses cooling water as the cooling medium, and then fed to the absorber on flow control. A slip-stream of the amine is circulated through the filter system (lean amine filter, amine carbon filter and amine particulate filter). The filter system removes solid impurities such as iron oxide, iron sulfide, pipe scale, dirt, hydrocarbons and degradation products from the solution. The filtered lean amine is sent to the amine surge tank.

In the FIG. 1-1*d*, the incineration section consists of a forced draft incinerator (36) and the air blower (37) and with or without the heat recovery (38) and (39). If heat is recovered then as part of energy saving, the additional steam is exported to the facility utility header. The combusted gas from the incinerator 37 is routed to the stack equipped with the SO2, O2, H2S, NOx, to monitor the emissions of less than 50 ppmv of SO2.

The treated tail gas from the absorber is sent to the Incinerator and during the startup directly from the sulfur recovery unit. The residual H2S and other sulfur compounds in this gas stream are oxidized to convert all the sulfur compounds to SO2.

In a case, heat recovery system is provided; the flue gas is cooled in a waste heat boiler by generating high-pressure steam. Part of the high-pressure steam is used for the tail gas heater. The rest of the high-pressure steam along with the excess high-pressure steam from the SRU is superheated in the superheater coil of the incinerator waste heat boiler before exporting to the high-pressure steam header. The incinerated flue gas is routed to the stack.

Figures 1, 1A:
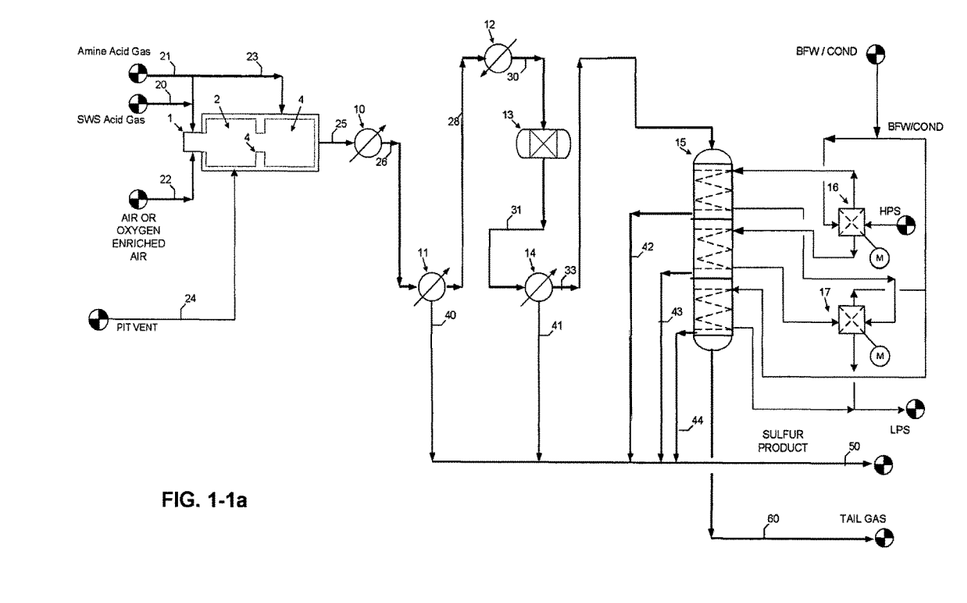
FIG. 1 consists of total 4 figures; as defined as FIG. 1-1a, FIG. 1-1b, FIG. 1-1c and FIG. 1-1d, respectively, and illustrates a schematic diagram embodiment of the present disclosure consisting of FIG. (1-1a) thermal section, one catalytic stage including, one SuperSulf 3 zones reactors. FIG. (1-1b) consists of tail gas treating unit consists of SuperSulf 2 zone reactors and quench system and the tail gas absorber. FIG. (1-1c) consists of the tail gas amine regeneration system. FIG. (1-1d) consists of the forced draft thermal incineration system.
Figures 1, 1B:
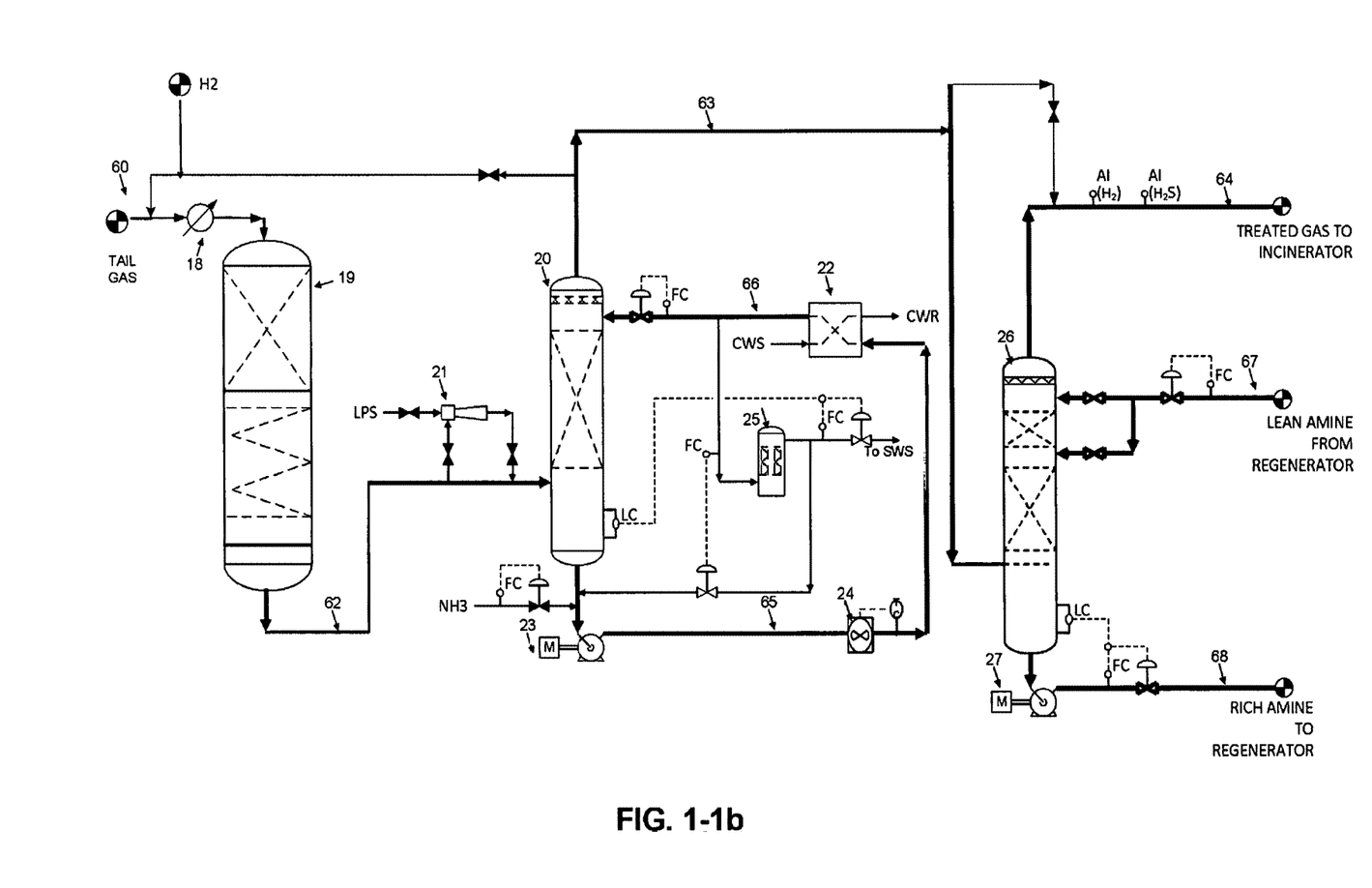
Figures 1, 1C:
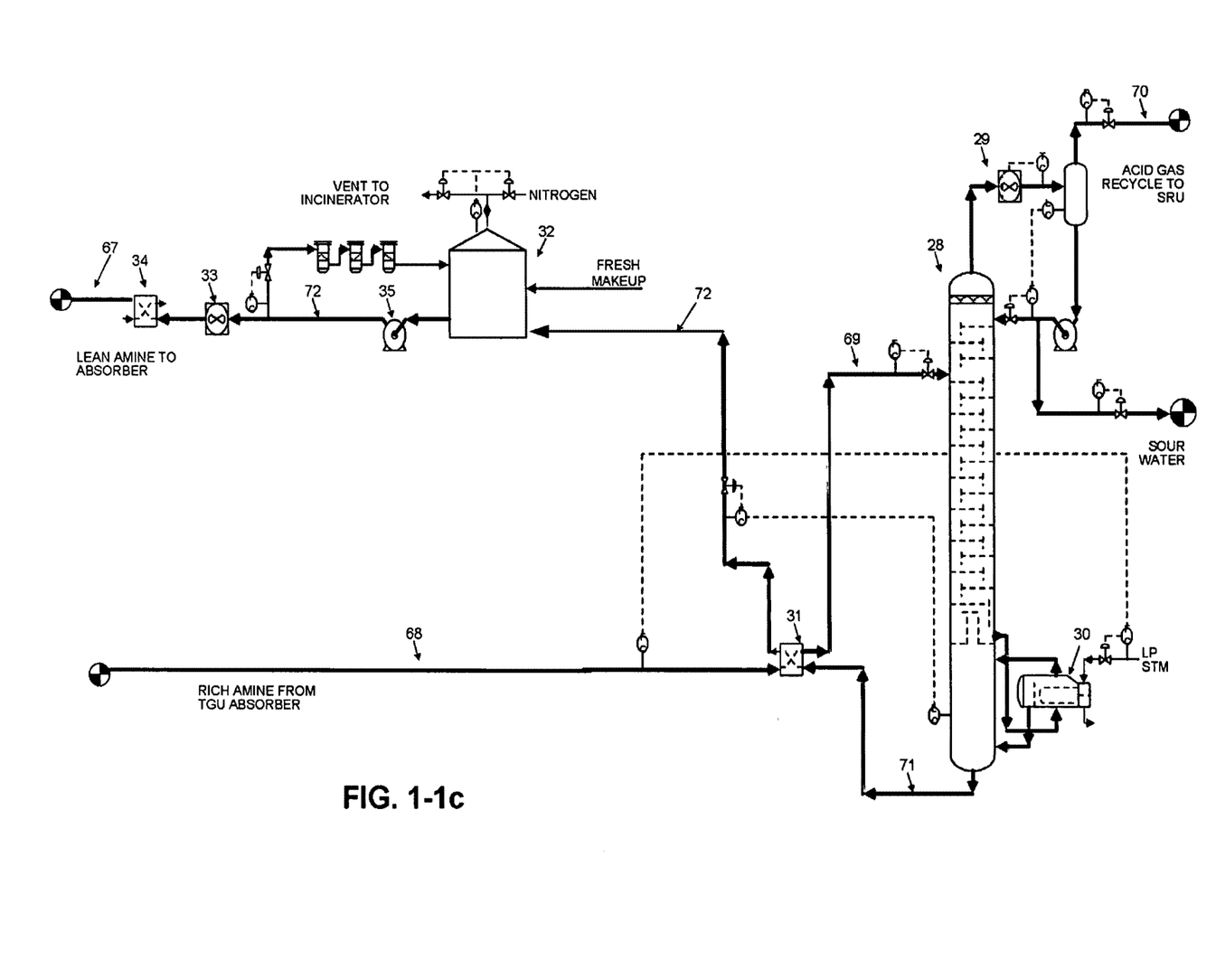
Figures 1, 1D:
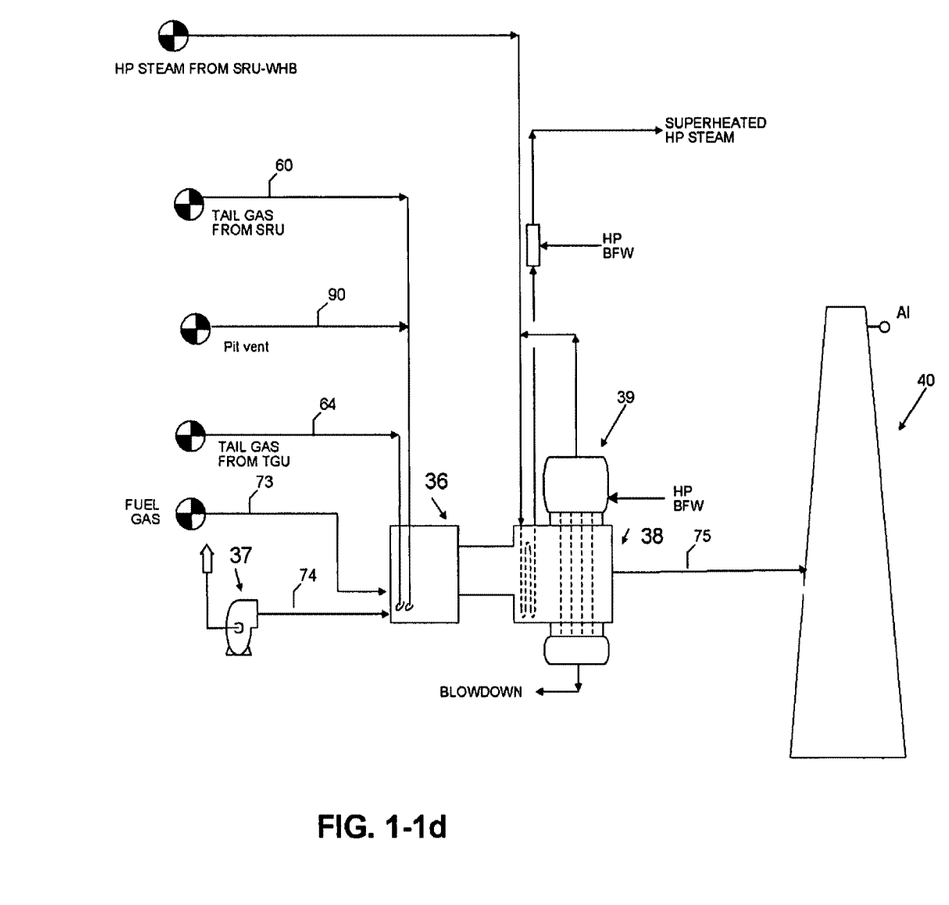
Figures 2, 2A:
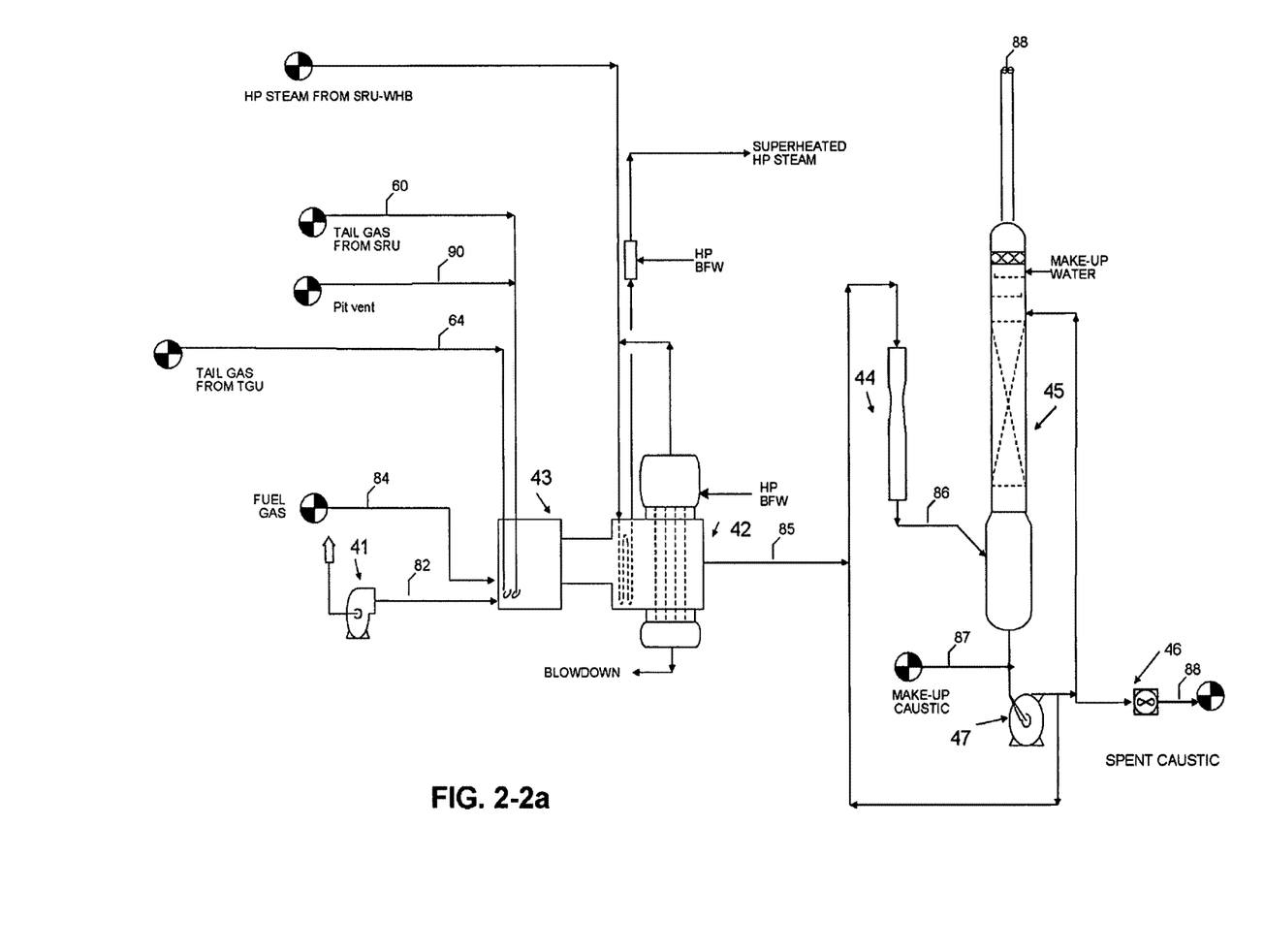
FIG. 2 consists of total 4 figures; as defined as, FIG. 1-1a, FIG. 1-1b and FIG. 1-1c and FIG. 2-2a respectively, where illustrates a schematic diagram of an alternate embodiment of the present disclosure consisting FIG. (1-1a) thermal section, one catalytic stage including, one SuperSulf 3 zones reactors, FIG. (1-1b) consists of tail gas treating unit consists of SuperSulf 2 zone reactors and quench system and the tail gas absorber. FIG. (1-1c) consists of the tail gas amine regeneration system. FIG. (2-2a) illustrates a schematic diagram of an alternate embodiment of the present disclosure consisting incineration with caustic scrubber for zero emission.
Figures 3, 3A:
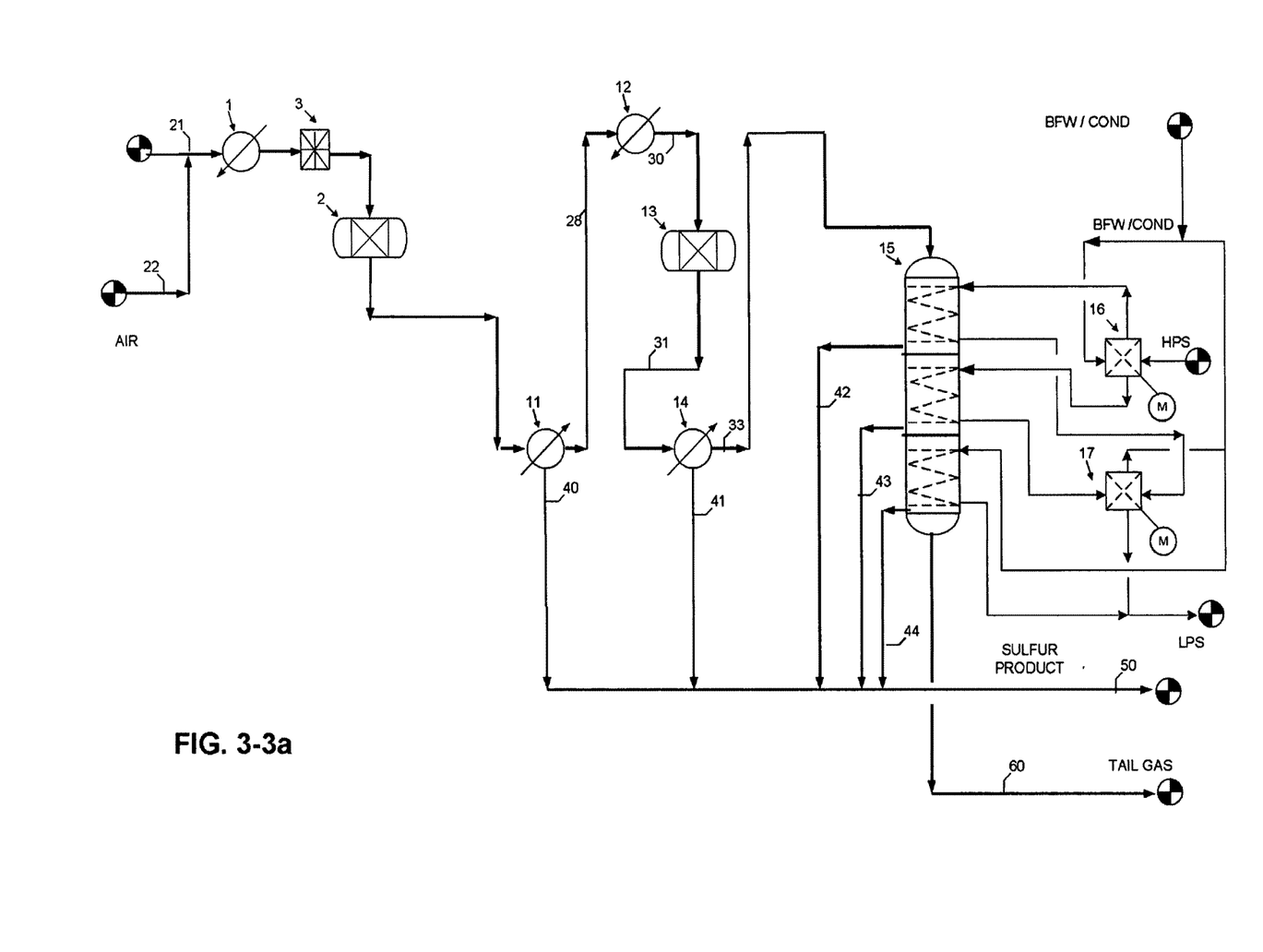
FIG. 3 consists of total 4 figures, as defined as FIG. 3-3a, FIG. 1-1b, FIG. 1-1c and the last figure could be FIG. 1-1d or as an alternate could be FIG. 2-2a respectively, where illustrates diagram of an alternate embodiment of the present disclosure where the thermal section in FIG. 1-1a can be replaced with a direct oxidation catalytic stage for lean gas application. Upon the emission requirements other figures can be added to improve the sulfur recovery as necessary.

Turning to FIG. 2, consists of FIGS. 1-1*a*, 1-1*b*, 1-1*c* and 2-2*a*, where the concept and the description is the same as described for FIGS. 1-1*a*, 1-1*b*, and 1-1*c* and 1-1*d* or consists of only FIG. 2-2*a* upon specific project size.

Turning to FIG. 2-2*a*, where near zero emission is achieved due to high sulfur recovery in this invention; the waste stream from spent caustic is not significant and can be sent to the water treatment system. According to the SO2 absorption by caustic, basically 2.5 tons of caustic for each ton of sulfur would be required.

The tail gas stream is sent to the Incinerator. The residual H2S and other sulfur compounds in this gas stream are oxidized to convert all the sulfur compounds to SO2.

The outlet from the incinerator waste heat boiler enters the venturi scrubber (44) and is contacted with the caustic circulation pump (47) to be cooled further. The cooled stream 66 then enters caustic scrubber (45) to absorb the SO2 from the gas. The gas stream 88 leaving the caustic scrubber (45) will contain less than 10 ppmv of SO2 which is routed through a short stack to a safe location.

It may be required to heat the stack gas prior to emitting to the atmosphere to prevent condensation. In some cases gas/gas heat exchanger might be used to cool the gas entering the caustic system further and to heat the gas from the caustic scrubber.

Fresh make up stream (87) is added to the caustic scrubber which gets re-circulated to the tower with the makeup water enters at the top. The spent caustic is then cooled in the caustic cooler (46) and the stream 88 is sent to the water treatment system.

The effluent gas from the Incinerator Waste Heat Boiler is desuperheated in a venturi scrubber by intimate contact with a 10 wt % caustic solution. During the liquid vapor contact a portion of the SO2 is removed from the vapor and the gas is cooled.

The liquid-vapor mixture then flows to the caustic scrubber. The vapor flows up through the packed bed of the caustic scrubber against a countercurrent stream of 10 wt % caustic solution to scrub the remaining SO2 from the tail gas. The treated gas leaving the caustic scrubber will contain low ppm levels of SO2.

Due to the temperature of the gas leaving the Incinerator Waste Heat Boiler there is a constant vaporization of water in the caustic scrubber which needs to be made up. This make up water is added to the column at the upper bubble trays to knock any remaining entrained caustic out of the vapor to minimize caustic loss. The caustic system uses a non-regenerable caustic (NaOH in water) to remove the SO2 from the tail gas. The SO2 that is removed slowly decreases the caustic strength of the solution so fresh caustic is added to replace this spent caustic. The Spent caustic is purged on level control and cooled before being sent off-plot for disposal.

Turning to FIG. 3-3a of this innovation, consists of FIGS. 3-3a, 1-1b, 1-1c and 1-1d or 2-2a. The FIG. 3-3a is the same as FIG. 1-1a except the burner and reaction furnace is replaced by a catalytic direct oxidation where applies for the lean acid gas application. Acid gas flows to the reheater (1) then through the mixer (3) flows to a direct oxidation reactor (2) where air is added to the reactor to establish the Claus reaction. The remaining description and the scheme is the same as FIG. 1-1a and other units and type of incineration can be added depending on the emission requirements. The direct oxidation catalyst types are Selectox, Titanium, or any direct oxidation catalyst suitable for this process. The description of the FIGS. 1-1b, 1-1c and 1-1d or 2-2a are the same as described as part of FIG. 1 and FIG. 2.

All the heat exchangers defined in this process can be of any type of commercial exchangers such as but not limited to fired heaters, shell and tube, plate and frame, air cooler, water cooler, boiler type, or any suitable exchangers.

All required control systems in the sulfur recovery tail gas treating and incineration are defined based on the latest commercial control systems including but not limited to local panel, DCS control room, burner management systems in the sulfur plant, switching valves sequencer control systems, reactors, condensers, columns incineration and all necessary equipment in this innovation.

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or sequence of steps of the methods described herein without departing from the concept and scope of the invention. Additionally, it will be apparent that certain agents which are both chemically and functionally related may be substituted for the agents described herein while the same or similar results would be achieved. All such similar substitutes or modifications apparent to those skilled in the art are deemed to be within the scope and concept of the invention. The disclosed and undisclosed embodiments are not intended to limit or restrict the scope or applicability of the invention conceived of by the Applicant, but rather, in conformity with the patent laws, Applicants intends to protect all such modifications and improvements to the full extent that such falls within the scope or range of equivalents.

We claim:
1. A process for the production of sulfur from a sulfur-containing acid gas stream the process comprising the following 5 steps:
step 1) at least one thermal stage which includes a furnace with at least one combustion chamber that generates the sulfur-containing acid gas stream;
step 2) the process further comprises a Claus unit, which feeds air, enriched air or oxygen into a first chamber in the at least one combustion chamber and comprises at least one catalytic stage containing titanium Claus catalyst to perform the Claus reaction by hydrolyzing sulfur-containing byproducts obtained from the at least one thermal stage;
step 3) the process further comprises a SuperSulf reactor used to convert sulfur-containing compounds to sulfur, the reactor comprises 3 reactor zones equipped with internal heating and internal cooling thermoplate exchangers and filled with the Claus catalysts between plates, and these zones operate under a SubDewPoint process to achieve higher recovery where zone 1 and 2 mode of operation switches between hot and cold at least once a day;
the SuperSulf reactor comprises motor operating switching valves to control these reactor zones for switching between high pressure boiling feed water and high pressure steam to hot or cold mode of operation for zone 1 and zone 2 and low pressure boiler feed water or low pressure condensate to zone 3 which is always cold, used to convert sulfur-containing compounds to sulfur;
step 4) the process further comprises a tail gas treating unit that consists of 2 zone-reactors, wherein one is a hydrogenation section using hydrogenation catalyst and the other is a hydrolysis reactor which includes internal cooling thermoplate exchangers filled with Claus catalysts between plates, which operates under either a steady state process or a SubDewPoint process to converts sulfur-containing compounds to H2S; and
step 5) an incineration system without or with caustic scrubber to achieve SO2 emission of less than 50 ppmv and less than 10 ppmv, respectively.

2. The process of claim 1, wherein the acid gas streams comprises at least one member selected from the group: H2S, NH3, HCN, H2, CO, CO2, O2, COS, N2, CS2, hydrocarbons, mercaptans, sulfur vapors and steam water.

3. The process of claim 1, wherein the step 1 reaction furnace is equipped with one or more checker walls or choke rings.

4. The process of claim 1, wherein, the at least one catalytic stages and Supersulf reactor zones comprises one or more Claus catalysts including alumina catalysts, activated alumina catalysts, alumina/titania catalysts, titania catalysts, ion with zinc, ion with nickel, Cr, Co/Mo, Mo, Mn, Co, Mg with promoter on alumina and with any other combination, the catalysts having a range of surface area, pore volume, shapes, Claus processes containing the catalyst are operated within converter and subsequent converters, such converter may be carried out at conventional reaction temperatures, ranging from about 200° C. to about 1300° C.

5. The process of claim 1, wherein, the at least one catalytic stage of step 2 comprises titanium catalyst to hydrolyze the sulfur compound byproduct from the reaction furnace and at least one Claus catalysts, which comprises alumina, promoted alumina, and titania.

6. The process of claim 1, wherein sulfur produced in reaction step 2 is condensed and separated from the gas before entering the SuperSulf reactors, in addition in all three zones of SuperSulf reactor, sulfur is recovered throughout the cycles.

7. The process of claim 1, wherein, the third zone of SuperSulf reactor in step 3 operates in cold mode at all times and consists of thermoplate internal cooling sulfur condenser thermoplate exchanger filled by the Claus catalysts between plates to prevent reverse Claus reaction, the recovery process from SuperSulf catalytic zones of the catalytic stages comprises cooling the product gas stream in one or more sulfur condensers to condense and recover elemental sulfur from the product gas stream.

8. The process of claim 1, wherein, the SuperSulf reactor in step 3 operates in a SubDewPoint mode where the cycles are hot, cold, cold and cold, hot, cold to achieve higher recovery, the combination of SubDewPoint operation and thermoplate internal cooling and heating reactors increase the sulfur recovery to the maximum level since sulfur can be cooled below sub dew point and sulfur vapor entrained is minimized.

9. The process of claim 1, wherein, the SuperSulf reactor temperature of step 3 is controlled by the high quality high pressure boiler feed water and high pressure condensate and high pressure steam which are switched through the switching valves by the proper control systems, and in addition, low pressure boiler feed water or low pressure condensate that is chloride-free is sent to zone 3 of the SuperSulf reactor for the last sulfur condenser.

10. The process of claim 1, wherein, the SuperSulf reactor of step 3 comprises thermoplate exchangers that operate as a cooling or heating exchangers depending on the mode of operation.

11. The process of claim 1, wherein, the switching valves of step 3 are 2-ways, 3-ways or 4-ways switching valves located on utilities lines.

12. The process of claim 1, wherein, the pressure of boiler feed water, steam condensate and steam of step 3 are from 1 barg (14.5 psig) up to 100 barg (1450 psig), hot mode steady operation operates at 40 barg (580 psig), cold mode steady operation and cold mode cooling phase cases operate at 1 barg (14.5 psig), cooling phase of hot mode reactor starts 2 hours prior to switch over, pressure decrease ramp from 40 barg (580 psig) to 4 barg (58 psig) is applied, cooling phase continues in the cold mode during first hour switch over, where steam pressure decreases from 4 barg to 1 barg, the highest steam volumetric flow rate is achieved at 1 barg during this operation mode therefore, only the cooling phase at 1 barg is specified.

13. The process of claim 1, wherein, the tail gas stream of step 3 is further processed in an amine tail gas treating unit using the generic amine solvent or selective solvent to absorb all the $H_2S$ and in the regeneration section the recovered.

14. The process of claim 1, wherein, the at least one catalytic stages of step 2 comprises hydrogenation catalyst Co/Mo (cobalt-molybdenum) and the Claus catalyst for hydrolysis reactor containing at least Alumina and Fe, Ni, Cr, Mo, Mn, Co.

15. The process of claim 1, wherein, the tail gas stream of step 4 is sent to the incineration system without caustic scrubber or with Caustic scrubber for achieving S02 emission of less than 50 ppmv and less than 10 ppmv, respectively, which is equivalent to 99.99% sulfur recovery.

16. The process of claim 1, wherein, the tail gas stream of step 4 is further processed in a tail gas treating unit consisting of 2 reactor zones; the first zone consisting of a hydrogenation reactor with a Co/Mo catalysts and the second reactor zone operates a hydrolysis reactor to convert the remaining sulfur compounds to H2S by using Claus catalyst.

17. The process of claim 1, wherein, the rate of air, enriched air or oxygen enrichment stream is adjusted based on the sulfur components in the sulfur-containing acid gas feed stream to the Claus unit mostly as $H_2S$; such that the mole ratio of hydrogen sulfide to sulfur dioxide in the gaseous-mixture reaction stream ranges from 2:1 to 10:1.

18. The process of claim 1, wherein, the at least one heat exchanger or multiple heat exchangers comprises at least one condenser, dual condensers or combination of thermoplate, water coolers and air coolers to achieve maximum sulfur condensation and sulfur recoveries.

19. The process of claim 1, wherein, in the reaction furnace, the sulfur-containing acid gas stream comprises one or more hydrocarbons selected from the group consisting of alkanes, alkenes, alkynes, cycloalkanes, aromatic hydrocarbons, and mixtures thereof.

* * * * *